US011753025B2

(12) United States Patent
Furuhashi et al.

(10) Patent No.: US 11,753,025 B2
(45) Date of Patent: Sep. 12, 2023

(54) VEHICLE CONTROL APPARATUS AND VEHICLE CONTROL METHOD

(71) Applicant: Honda Motor Co., Ltd., Tokyo (JP)

(72) Inventors: Satoshi Furuhashi, Wako (JP); Shunji Tsukabayashi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 319 days.

(21) Appl. No.: 17/179,362

(22) Filed: Feb. 18, 2021

(65) Prior Publication Data
US 2021/0269050 A1  Sep. 2, 2021

(30) Foreign Application Priority Data
Feb. 27, 2020 (JP) .................. 2020-031934

(51) Int. Cl.
B60W 50/02 (2012.01)
B60W 30/182 (2020.01)
B60W 50/14 (2020.01)
B60W 30/18 (2012.01)

(52) U.S. Cl.
CPC ...... *B60W 50/0205* (2013.01); *B60W 30/182* (2013.01); *B60W 30/18018* (2013.01); *B60W 50/14* (2013.01); *B60W 2050/021* (2013.01)

(58) Field of Classification Search
CPC ....... B60W 50/0205; B60W 30/18018; B60W 30/182; B60W 50/14; B60W 2050/021; B60W 2050/0006; B60W 50/023; B60R 16/023
See application file for complete search history.

(56) References Cited

U.S. PATENT DOCUMENTS

| | | | | |
|---|---|---|---|---|
| 2006/0235594 A1* | 10/2006 | Knoefler | ............ | G05B 19/0421 701/1 |
| 2012/0151118 A1* | 6/2012 | Flynn | .................... | G06F 3/0619 711/170 |
| 2014/0052326 A1* | 2/2014 | Seufert | ................. | F16H 61/688 701/29.2 |
| 2014/0250338 A1* | 9/2014 | Prabhakaran | ....... | G06F 11/0745 714/56 |
| 2014/0350772 A1* | 11/2014 | Saito | .................... | G07C 5/0808 701/29.1 |

(Continued)

FOREIGN PATENT DOCUMENTS

JP   2002314632 A   10/2002

*Primary Examiner* — Jeff A Burke
*Assistant Examiner* — Madison B Emmett
(74) *Attorney, Agent, or Firm* — Duft & Bornsen, PC

(57) ABSTRACT

A vehicle control apparatus includes a plurality of control units communicable with each other. The plurality of control unit includes a host unit and a plurality of lower units managed by the host unit. The vehicle control apparatus configured to perform: specifying a lower unit used for executing a predetermined operation among the plurality of lower units when received a signal for instructing any one of the plurality of lower units to start the predetermined operation of the vehicle control apparatus; outputting an activation request command to the lower unit used for executing the predetermined operation; and outputting, after a predetermined time elapsed since the activation request command is output, an operation start command of the predetermined operation to the lower unit used for executing the predetermined operation.

19 Claims, 9 Drawing Sheets

(56) References Cited

U.S. PATENT DOCUMENTS

| | | | |
|---|---|---|---|
| 2015/0261704 A1* | 9/2015 | Vaccaro | G06F 13/364 |
| | | | 710/114 |
| 2019/0081816 A1* | 3/2019 | Lee | H04L 12/4013 |
| 2019/0250610 A1* | 8/2019 | Luo | G05D 1/0088 |
| 2019/0302753 A1* | 10/2019 | Fujii | G05D 1/0088 |
| 2019/0384522 A1* | 12/2019 | Yun | B60W 60/00 |
| 2020/0162273 A1* | 5/2020 | Han | H04L 12/40026 |
| 2020/0389338 A1* | 12/2020 | Park | H04L 12/40 |
| 2021/0112512 A1* | 4/2021 | Dickie | G06F 1/12 |
| 2021/0167881 A1* | 6/2021 | Zinner | H04L 12/40006 |
| 2022/0009508 A1* | 1/2022 | Rapp | B60R 16/0231 |

* cited by examiner

FIG. 5

| OPERATION NAME | OPERATION ID | UNIT ID |
|---|---|---|
| AIR CONDITIONER OPERATION | 1 | ECU_A, ECU_B, ECU_C |
| CHARGING OPERATION | 2 | ECU_C, ECU_D, ECU_E |
| ⋮ | ⋮ | ⋮ |

VEHICLE CONTROL APPARATUS AND VEHICLE CONTROL METHOD

CROSS-REFERENCE TO RELATED APPLICATION

This application is based upon and claims the benefit of priority from Japanese Patent Application No. 2020-031934 filed on Feb. 27, 2020, the content of which is incorporated herein by reference.

BACKGROUND OF THE INVENTION

Field of the Invention

This invention relates to a vehicle control apparatus configured to control a vehicle and a vehicle control method of the vehicle control apparatus.

Description of the Related Art

Conventionally, as an apparatus of this type, there has been known an apparatus including a plurality of ECUs (electronic control units), in which each ECU periodically communicates with other ECUs to detect the presence or absence of failure of the other ECUs based on information obtained by the communication. Such an apparatus is disclosed, for example, in JP 2002-314632 A.

In an apparatus including a plurality of ECUs, when a single ECU receives an activation request, the single ECU is activated, and then the other ECUs are activated by the single ECU. Therefore, in the apparatus including the plurality of ECUs, each ECU may be activated at a different timing. Therefore, in a configuration in which failure detection is always performed as in the apparatus described in JP 2002-314632 A, when each ECU is activated at a different timing, there is a possibility that a communication abnormality occurs with the ECU that is not activated, or that erroneous detection of failure occurs.

SUMMARY OF THE INVENTION

An aspect of the present invention is a vehicle control apparatus including a plurality of control units communicable with each other. The plurality of control unit includes a host unit and a plurality of lower units managed by the host unit, and the host unit includes a microprocessor and a memory connected to the microprocessor. The microprocessor is configured to perform: specifying a lower unit used for executing a predetermined operation among the plurality of lower units when received a signal for instructing any one of the plurality of lower units to start the predetermined operation of the vehicle control apparatus; outputting an activation request command to the lower unit used for executing the predetermined operation; and outputting, after a predetermined time elapsed since the activation request command is output, an operation start command of the predetermined operation to the lower unit used for executing the predetermined operation.

Another aspect of the present invention is a vehicle control method of a vehicle control apparatus including a plurality of control units communicable with each other, the vehicle control method including: specifying a lower unit used for executing a predetermined operation among the plurality of lower units when received a signal for instructing any one of the plurality of lower units to start the predetermined operation of the vehicle control apparatus; outputting an activation request command to the lower unit used for executing the predetermined operation; and outputting, after a predetermined time elapsed since the activation request command is output, an operation start command of the predetermined operation to the lower unit used for executing the predetermined operation.

BRIEF DESCRIPTION OF THE DRAWINGS

The objects, features, and advantages of the present invention will become clearer from the following description of embodiments in relation to the attached drawings, in which:

FIG. 5 is a diagram showing an example of a unit specifying table;

DETAILED DESCRIPTION

An embodiment of the present invention will be described below with reference to FIGS. 1A to 8. A vehicle control apparatus according to the embodiment of the present invention is applied to a vehicle including a plurality of ECUs.

In recent years, a vehicle having a timer function such as a timer charging function or a timer air conditioner function for starting a predetermined operation (charging operation or air conditioner operation) at a preset time has appeared. In order to operate such a function when the vehicle is turned off, it is necessary to activate the ECU required for executing the predetermined operation at a preset time. In this case, when there are a plurality of ECUs required for executing the predetermined operation, a single ECU is first activated by a timer, and then the activated single ECU outputs an activation request command to the other ECUs required for executing the predetermined operation to activate those ECUs. However, in such an activation method, a deviation occurs in the activation timing between the ECU activated by the timer and the ECU activated by the activation request command from the ECU. In particular, when the ECUs are hierarchically connected, a deviation also occurs in the time at which the activation request command reaches each of the ECUs, so that the deviation in the activation timing between the ECUs becomes larger. In such a situation, if each of the ECUs starts a communication process for failure detection immediately after the activation, there is a possibility that a communication abnormality occurs with the ECU that has not yet been activated, or that erroneous detection of failure occurs.

Therefore, in the present embodiment, a description will be given of a vehicle control apparatus that controls each of the ECUs so as not to cause communication abnormality or erroneous detection of failure when, in the vehicle having the timer charging function or the timer air conditioner function as described above, the function is operated.

Figure 1A:
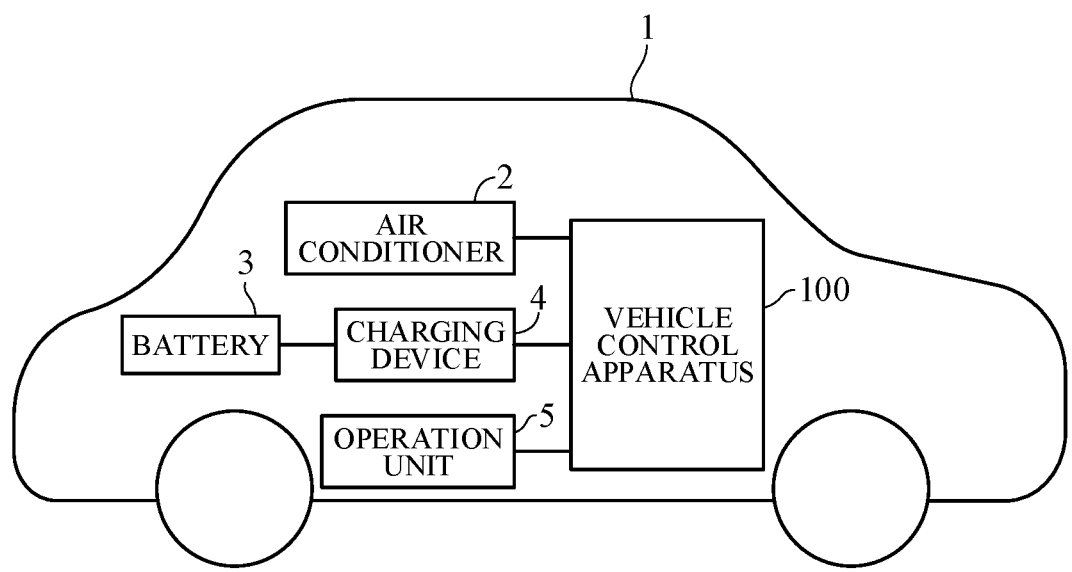
FIG. 1A is a diagram showing a schematic configuration of a vehicle to which a vehicle control apparatus according to an embodiment of the present invention.

First, a configuration of a vehicle to which the vehicle control apparatus according to the present embodiment is applied will be described. FIG. 1A is a diagram showing a schematic configuration of a vehicle 1 to which a vehicle control apparatus 100 according to the embodiment of the present invention is applied. As shown in FIG. 1A, the vehicle 1 includes, in addition to the vehicle control apparatus 100, an air conditioner 2, a battery 3, a charging device 4, and an operation unit 5. The vehicle control apparatus 100 achieves an air conditioner function by controlling driving of the air conditioner 2. The vehicle control apparatus 100 achieves a charging function for charging the battery 3 by controlling the charging device 4 to supply power from external power to the battery 3. The battery 3 is, for example, a nickel storage battery or a lithium storage battery.

The operation unit 5 includes an operation switch for setting an air conditioner function and a charging function. In the present embodiment, the operation unit 5 includes a touch panel (not shown) and displays a touch switch on the touch panel. The operation unit 5 also functions as a display unit that displays the setting contents of the air conditioner function and the charging function, the states of the air conditioner 2 and the battery 3, and the like on the touch panel.

The vehicle 1 may include other devices than the air conditioner 2 and the charging device 4. The vehicle 1 may have functions other than the air conditioner function and the charging function.

Figure 1B:
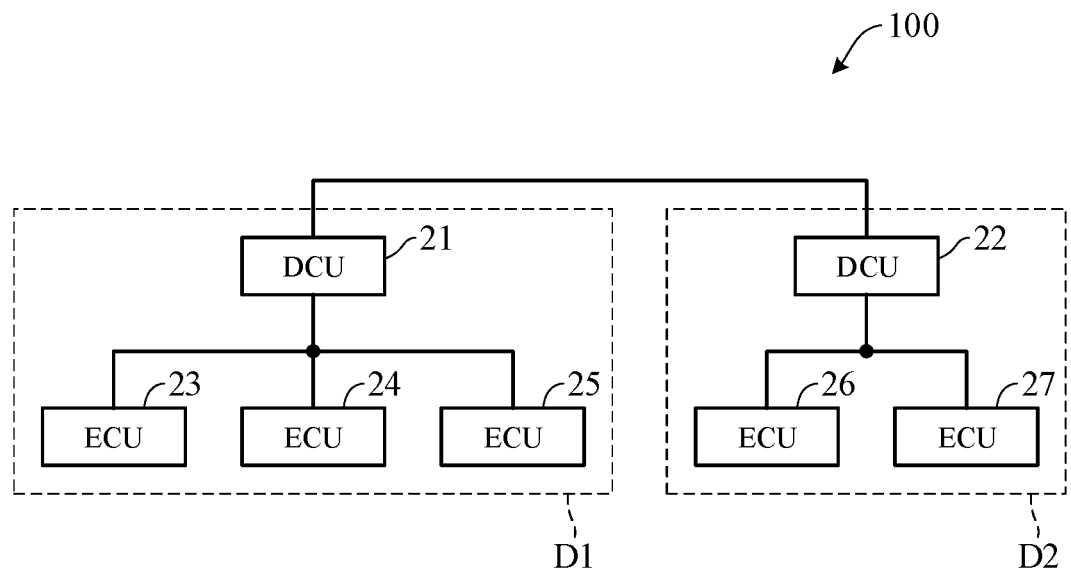
FIG. 1B is a diagram showing a schematic configuration of the vehicle control apparatus according to an embodiment of the present invention.

FIG. 1B is a diagram showing a schematic configuration of the vehicle control apparatus 100 according to the embodiment of the present invention. As shown in FIG. 1B, the vehicle control apparatus 100 includes a plurality of ECUs (Electric Control Units) 21 to 27 connected by an on-vehicle communication network such as a CAN (Controller Area Network). Hereinafter, the ECU may be simply referred to as a control unit.

In the present embodiment, as shown in FIG. 1B, the plurality of ECUs 21 to 27 are assigned to a plurality of domains (domains D1 and D2 in FIG. 1B). The ECUs 21 and 23 to 25 are assigned to the domain D1, and the ECUs 22, 26, and 27 are assigned to the domain D2. Further, in the domains D1 and D2, the ECUs are hierarchically connected. The configuration shown in FIG. 1B is an example, and the assignment of the ECUs to the domains D1 and D2 is not limited to this.

The ECUs 21 and 22 assigned to the upper hierarchy are domain control units that communicate with devices connected to a communication network outside the vehicle via TCUs (telematics control units) (not shown), or relay communication between domains. Hereinafter, the ECUs 21 and 22 are referred to as DCUs (Domain Control Units) 21 and 22. The DCUs 21 and 22 assigned to the upper hierarchy are referred to as host units, and the ECUs 23 to 25, 26, and 27 assigned to the lower hierarchy are referred to as lower units.

In the present embodiment, the ECU 23 in the domain D1 is an air conditioner ECU that controls the air conditioner 2. The ECU 23 controls the temperature and air volume of the air conditioner 2 based on information acquired from the ECUs 24 and 25 in the same domain and performs control of transmitting information indicating the state of the air conditioner 2 to those ECUs. The ECU 26 in the domain D2 is a charging ECU that controls the charging device 4. The ECU 26 performs control of adjusting the power supplied to the charging device 4 based on information acquired from the ECU 27 in the same domain and the ECU 25 in a different domain (domain D1), and transmitting information indicating the state of the charging device 4 to those ECUs.

Figure 2A:
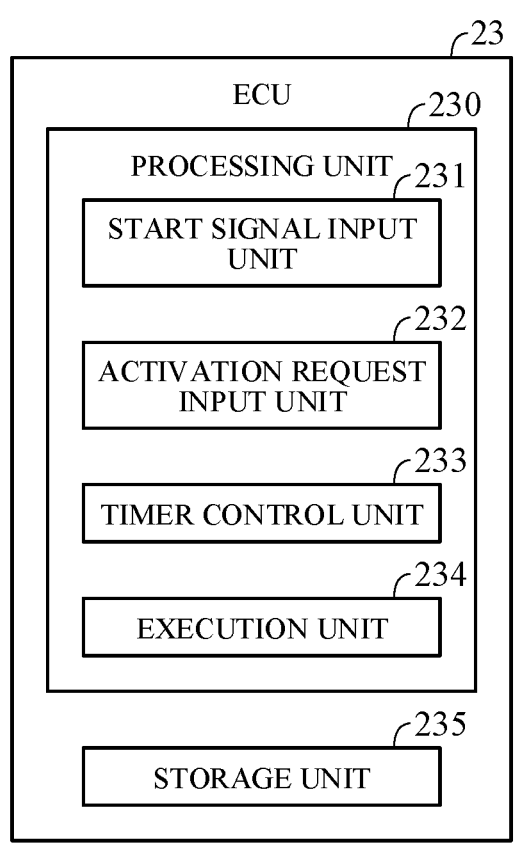
FIG. 2A is a diagram showing a functional configuration of a lower unit of the vehicle control apparatus according to the embodiment of the present invention.

Next, a functional configuration of the vehicle control apparatus 100 according to the embodiment of the present invention will be described. First, a functional configuration of the lower units (ECUs 23 to 27) will be described. FIG. 2A is a diagram showing the functional configuration of the lower units of the vehicle control apparatus 100 according to the embodiment of the present invention. Since functional configurations of the lower units are the same, a functional configuration of the ECU 23 will now be described.

As shown in FIG. 2A, the ECU 23 includes a processing unit 230 such as a CPU (microprocessor), and a memory (storage unit) 235 such as a ROM, a RAM, or a hard disk. The processing unit 230 executes a program stored in the storage unit 235, thereby functioning as a start signal input unit 231, an activation request input unit 232, a timer control unit 233, and an execution unit 234.

The start signal input unit 231 receives a signal (hereinafter referred to as a start signal or an activation request signal) from a timer (not shown). When receiving the start signal, the start signal input unit 231 outputs an activation request command to its host unit (DCU 21 in FIG. 1B) and activates the ECU 23. The term "activates the ECU 23" means that the execution unit 234 is made operable. The timer may be a timer provided in the ECU 23 or a timer installed outside the ECU 23.

When receiving the activation request command from its host unit (DCU 21 here), the activation request input unit 232 activates the ECU 23.

The timer control unit 233 controls the timer based on information for operating a timer charging function or a timer air conditioner function at a specified time, that is, information for starting a predetermined operation (charging operation or air conditioner operation) at a specified time (hereinafter referred to as timer setting information). In the present embodiment, the timer control unit 233 receives the timer setting information from the operation unit 5, sets a count value to the timer based on the received timer setting information, and starts a timer counting operation. The timer setting information may be input from a device other than the operation unit 5, such as a user terminal connected to a communication network outside the vehicle. The execution unit 234 executes a process for controlling the air conditioner 2 and a communication process for failure detection. Although the operation of the execution unit is different for each lower unit, the communication process for failure detection is performed in the execution units of all the lower units.

Figure 2B:
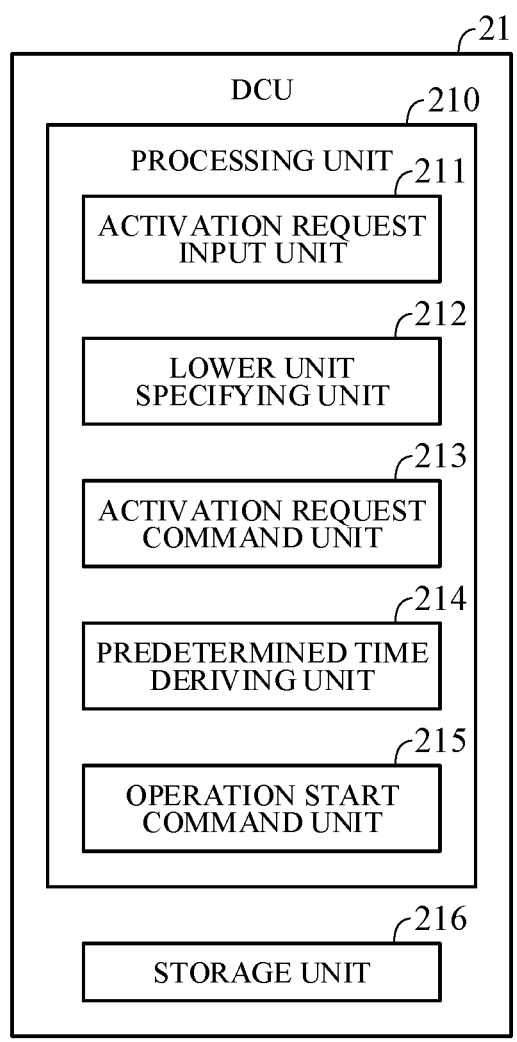
FIG. 2B is a diagram showing a functional configuration of a host unit of the vehicle control apparatus according to the embodiment of the present invention.

Next, a functional configuration of the host units (DCUs 21 and 22) will be described. FIG. 2B is a diagram showing the functional configuration of the host units of the vehicle control apparatus 100 according to the embodiment of the present invention. Since functional configurations of the host units are the same, a functional configuration of the DCU 21 will now be described.

As shown in FIG. 2B, the DCU 21 includes a processing unit 210 such as a CPU (microprocessor), and a memory (storage unit) 216 such as a ROM, a RAM, or a hard disk. The processing unit 210 executes a program stored in the storage unit 216, thereby functioning as an activation request input unit 211, a lower unit specifying unit (hereinafter simply referred to as a specification unit) 212, an activation request command unit 213, a predetermined time deriving unit 214, and an operation start command unit 215.

When the activation request input unit 211 receives an activation request command from a lower unit in the domain or receives an activation request command from a DCU in another domain, the activation request input unit 211 activates the DCU 21. The term "activates the DCU 21" means that each of the units 212 to 216 is made operable.

When the activation request input unit 211 receives an activation request command from a lower unit in the domain, the specification unit 212 specifies a kind of predetermined operation and a lower unit necessary for executing the predetermined operation from the activation request command. A method of specifying a lower unit in the specification unit 212 will be described later. In the present embodiment, the lower unit necessary for executing the air conditioner operation is the ECUs 23, 24, and 25. The Lower unit necessary for executing the charging operation is the ECUs 26 and 27 and the ECU 25.

The activation request command unit 213 outputs an activation request command to the lower units specified by the specification unit 212. The predetermined time deriving unit 214 predicts (derives) a predetermined time from the time when the activation request command unit 213 outputs the activation request command to the time when all the lower units of the output destination of the activation request command are activated.

The operation start command unit 215 outputs a command for executing a predetermined operation to the lower units specified by the specification unit 212 (hereinafter referred to as an operation start command) after the predetermined time has elapsed from the output of the activation request command by the activation request command unit 213.

The storage unit 216 stores, in addition to the program, information necessary for the predetermined time deriving unit 214 to derive the predetermined time. The information stored in the storage unit 216 will now be described. An activation time when the lower unit activates a lower unit belonging to the same domain (hereinafter referred to as a first activation time) is set to 5 seconds. An activation time when the lower unit activates a lower unit belonging to an adjacent domain (hereinafter referred to as a second activation time) is set to 7 seconds obtained by adding 2 seconds to the first activation time. Hereinafter, a difference between the first activation time and the second activation time (2 seconds) is referred to as a domain addition time. An activation time when the lower unit activates a lower unit belonging to a domain further adjacent to the adjacent domain (hereinafter referred to as a third activation time) is set to 9 seconds obtained by adding the domain addition time (2 seconds) to the second activation time. That is, an activation time when the lower unit activates a lower unit belonging to an n adjacent domain is set to a time obtained by adding (2×n) seconds to the first activation time. At this time, the predetermined time can be derived using the first activation time and the domain addition time. Therefore, information indicating at least the first activation time and the domain addition time may be stored in the storage unit 216.

Figure 3:
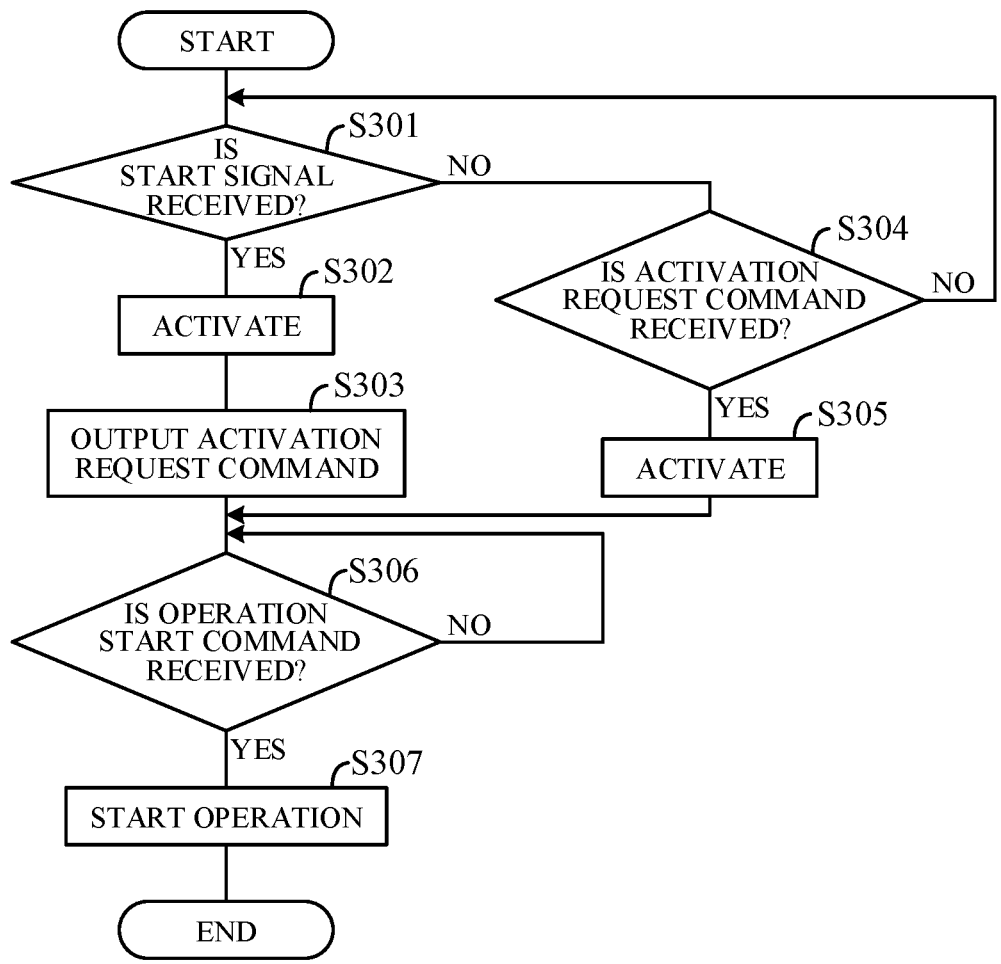
FIG. 3 is a flowchart showing an example of a process executed by the lower unit of the vehicle control apparatus.

FIG. 3 is a flowchart showing an example of a process executed by the lower unit of the vehicle control apparatus 100. The process shown in FIG. 3 is repeatedly executed in a predetermined cycle while power is supplied to the lower unit. The lower unit is supplied with power from the battery 3 or the like even in a state where the power of the vehicle 1 is off. Since processes executed in the lower units are the same, a process executed by the air conditioner ECU (ECU 23) will be described below.

First, in step S301, the start signal input unit 231 of the ECU 23 determines whether or not a start signal from the timer has been received. If the determination is affirmative in step S301, in step S302, the ECU 23 is activated. Thus, the execution unit 234 becomes operable. Next, in step S303, the execution unit 234 outputs an activation request command to its host unit, that is, the DCU 21, and the process proceeds to step S306.

On the other hand, if the determination is negative in step S301, in step S304, the activation request input unit 232 determines whether or not an activation request command has been received from the DCU 21 of the host unit. If the determination is negative in step S304, the process returns to step S301. If the determination is affirmative in step S304, in step S305, the ECU 23 is activated. Thus, the execution unit 234 becomes operable.

In step S306, the execution unit 234 determines whether or not an operation start command has been received from the DCU 21. Step S306 is repeated until it is affirmed. If the determination is affirmative in step S306, in step S307, the execution unit 234 starts the operation.

Figure 4:
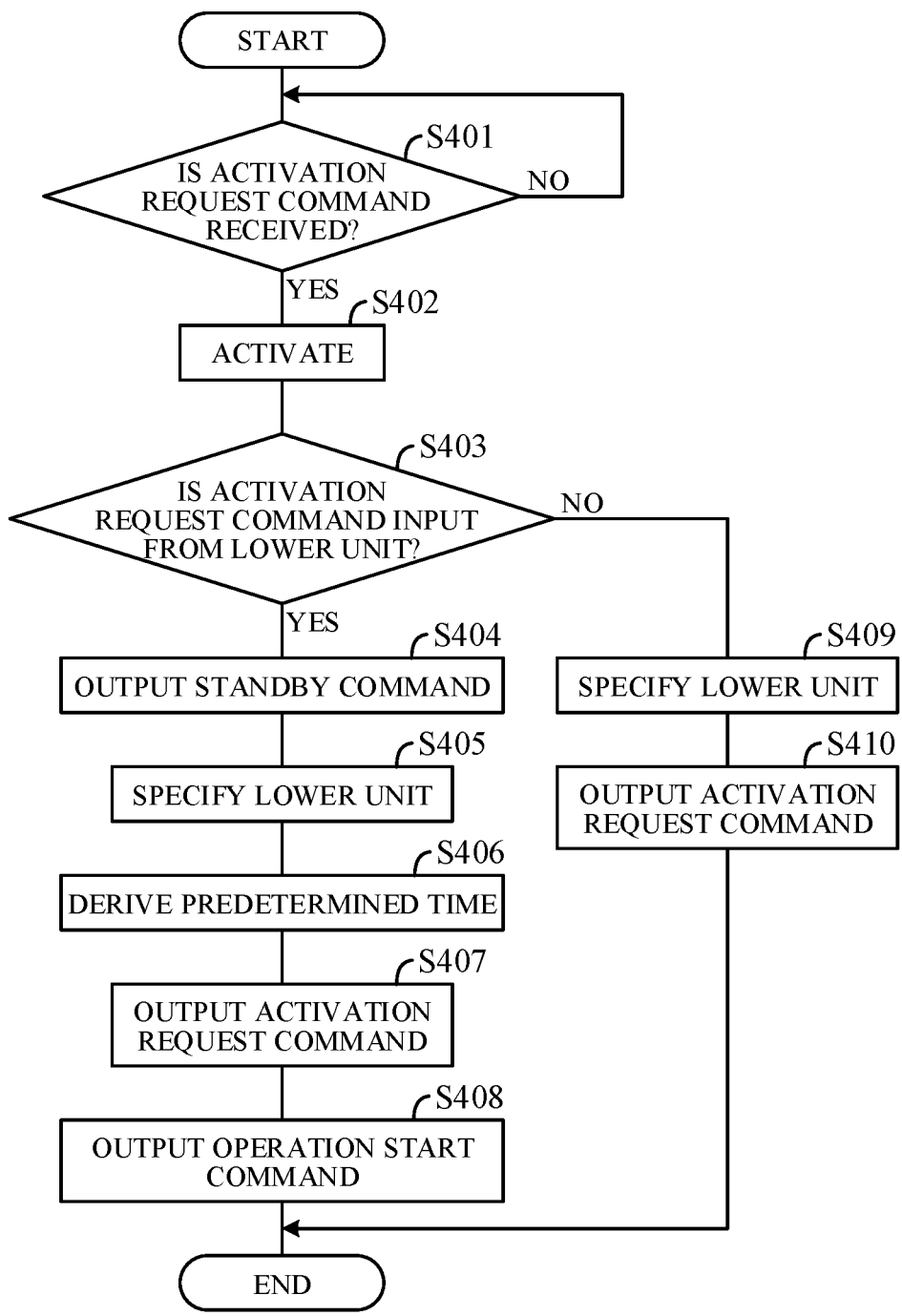
FIG. 4 is a flowchart showing an example of a process executed by the host unit of the vehicle control apparatus.

FIG. 4 is a flowchart showing an example of a process executed by the host unit of the vehicle control apparatus 100. The process shown in FIG. 4 is repeatedly executed in a predetermined cycle while power is supplied to the host unit. The host unit is supplied with power from the battery 3 or the like even in a state where the power of the vehicle 1 is off. Since processes executed in the host units are the same, a process executed by the DCU 21 will be described below.

First, in step S401, the activation request input unit 211 of the DCU 21 determines whether or not an activation request command has been input from a lower unit in the domain or from another domain. Step S401 is repeated until it is affirmed. If the determination is affirmative in step S401, in step S402, the activation request input unit 211 activates the DCU 21. Thus, each of the units 212 to 215 becomes operable. Next, in step S403, the activation request input unit 211 determines whether or not the activation request command input in step S401 is input from a lower unit in the domain. If the determination is negative in step S403, the process proceeds to step S409. If the determination is affirmative in step S403, the process proceeds to step S404.

In step S404, the specification unit 212 outputs a standby command to the lower unit of the output source of the activation request command. The standby command is a command for preventing at least a communication process for fault detection from being executed. Next, in step S405, the specification unit 212 specifies a predetermined operation designated by the activation request command input from the lower unit in the domain and a lower unit necessary for executing the predetermined operation.

The method of specifying a lower unit in the specification unit 212 will now be described. It is assumed that the DCU 21 has previously stored in the storage unit 216 table (hereinafter referred to as a unit specifying table) for storing the respective predetermined operations and the lower units necessary for executing the respective predetermined operations in association with each other. FIG. 5 is a diagram showing an example of the unit specifying table. As shown in FIG. 5, the unit specifying table stores identification information of each predetermined operation (operation ID) and identification information of the lower unit (unit ID)

necessary for executing each predetermined operation in association with each other. ECU A to ECU E in the figure are unit IDs of the ECUs 23 to 27, respectively. The specification unit 212 refers to the unit specifying table stored in the storage unit 216 and specifies the lower unit necessary for executing each predetermined operation.

For example, when the start signal input unit 231 of the air conditioner ECU (ECU 23) receives a start signal of the air conditioner operation, the start signal input unit 231 outputs an operation ID of the air conditioner operation together with an activation request command to the DCU 21 of the host unit. The specification unit 212 of the DCU 21 specifies a kind of the predetermined operation (air conditioner operation here) from the operation ID input from the lower unit. Further, the specification unit 212 reads the unit ID corresponding to the operation ID from the unit specifying table, and specifies the lower unit (ECUs 23, 24, and 25 here) necessary for executing the air conditioner operation.

Next, in step S406, the predetermined time deriving unit 214 derives a predetermined time from the time when the activation request command is output to the lower units specified in step S405 to the time when all the lower units are activated. For example, if the lower units specified in step S405 all belong to the same domain, the predetermined time deriving unit 214 derives a first predetermined time (5 seconds) as the predetermined time.

Next, in step S407, the activation request command unit 213 outputs an activation request command to the lower units specified by the specification unit 212 to activate the lower units. In this case, the activation request command unit 213 may output a standby command to the lower units of the output destination of the activation request command. When the lower units specified by the specification unit 212 include a lower unit belonging to another domain, the activation request command unit 213 outputs identification information of the lower unit to a host unit (DCU) of another domain together with the activation request command.

When a predetermined time (predetermined time derived in step S406) elapses after the activation request command unit 213 outputs the activation request command, in step S408, the operation start command unit 215 outputs an operation start command to the lower units of the output destination of the activation request command. Thus, the predetermined operation is started by the lower units specified by the specification unit 212. When the lower units specified by the specification unit 212 include a lower unit belonging to another domain, the operation start command unit 215 outputs identification information of the lower unit to a host unit (DCU) of another domain together with the operation start command.

On the other hand, in step S401, if the activation request input unit 211 of the DCU 21 receives an activation request command from another domain, the determination is negative in step S403, and the processes in steps S409 and S410 are executed. For example, when the charging ECU (ECU 26) in the domain D2 receives a start signal of the charging operation, since the ECU 25 in the domain D1 is included in the lower units required for executing the charging operation (see FIG. 5), the DCU 22 in the domain D2 outputs an activation request command to the DCU 21.

In step S409, the specification unit 212 specifies the lower unit to which the activation request command is to be output from the identification information of the lower unit associated with the activation request command input in step S401. Next, in step S410, the activation request command unit 213 outputs an activation request command to the lower unit specified by the specification unit 212 to activate the lower unit. In this case, the activation request command unit 213 may output a standby command to the lower units of the output destination of the activation request command.

Here, referring to FIGS. 6 and 7, an operation of the vehicle control apparatus 100 when the lower unit receives a start signal of a predetermined operation in a state where the vehicle 1 is turned off will be described.

Figure 6:
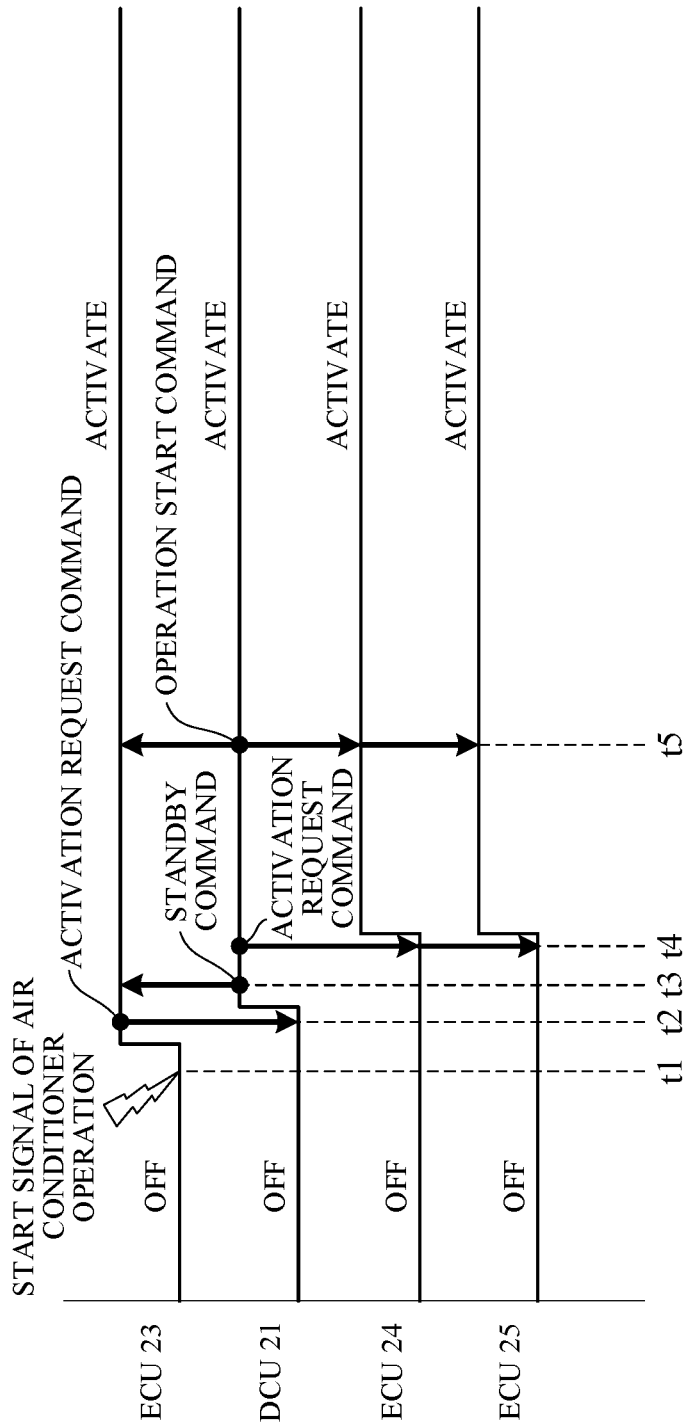
FIG. 6 is a time chart showing an example of an operation of the vehicle control apparatus.

FIG. 6 is a time chart showing the operation of the vehicle control apparatus 100 when the air conditioner ECU (ECU 23) receives a start signal of the air conditioner operation. As shown in FIG. 6, at a time point t1, the ECU 23 receives the start signal of the air conditioner operation (S301). Thus, the ECU 23 is activated (S302). At a time point t2, the ECU 23 outputs the activation request command to the DCU 21 which is its host unit (S303). Thus, the DCU 21 is activated (S401 and S402). At a time point t3, the DCU 21 outputs the standby command to the ECU 23 (S403 and S404). After receiving the standby command, the ECU 23 stands by without starting the operation.

At a time point t4, the DCU 21 specifies the lower unit necessary for executing the air conditioner operation (S405). At this time, the ECUs 23, 24, and 25 are specified (see FIG. 5). Further, the DCU 21 derives the predetermined time until activation of all the specified lower units is completed (S406). Since the ECUs 23, 24, and 25 all belong to the same domain, the first predetermined time (5 seconds) is derived as the predetermined time. After deriving the predetermined time, the DCU 21 outputs the activation request command to all the specified lower units (S407). At this time, the DCU 21 does not output an activation request command to the ECU 23 that has already been activated. Thereafter, at a time point t5 when the predetermined time has elapsed from the time point t4, the DCU 21 outputs the operation start command to the ECUs 23, 24, and 25 (S408). Thus, the air conditioner operation by the ECUs 23, 24, and 25 is started (S306 and S307).

Figure 7:
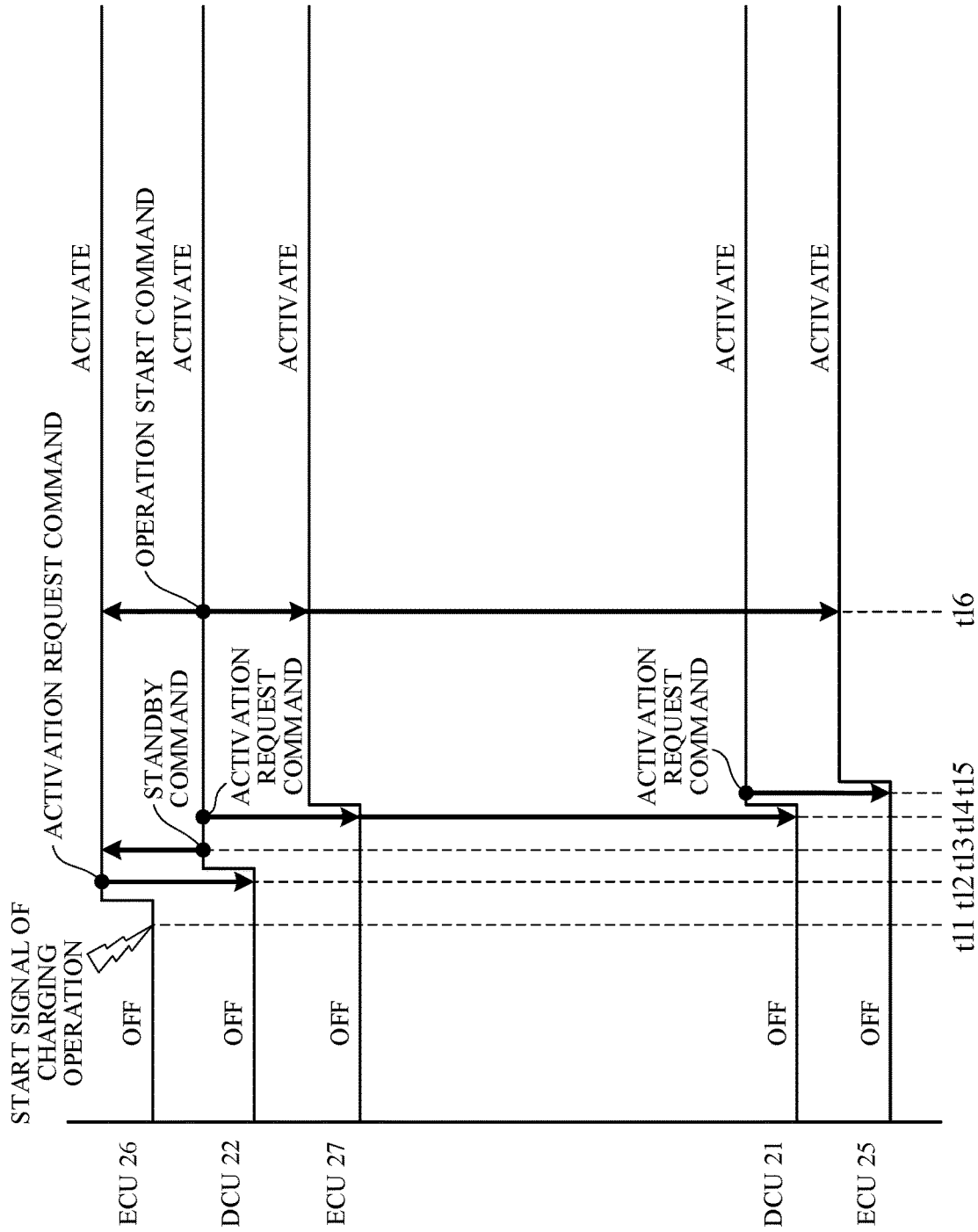
FIG. 7 is a time chart showing another example of an operation of the vehicle control apparatus.

FIG. 7 is a time chart showing the operation of the vehicle control apparatus 100 when the charging ECU (ECU 26) receives a start signal for starting the charging operation at a specified time. In the timer charging function, when the ECU 26 receives the start signal, it is necessary to activate the ECU 25 belonging to the domain adjacent to the ECU 26. Therefore, in this respect, the operation of the vehicle control apparatus 100 shown in FIG. 7 is different from the operation shown in FIG. 6.

As shown in FIG. 7, at a time point t11, the ECU 26 receives the start signal of the charging operation (S301). Thus, the ECU 26 is activated (S302). At a time point t12, the ECU 26 outputs the activation request command to the DCU 22 which is its host unit (S303). Thus, the DCU 22 is activated (S401 and S402). At a time point t13, the DCU 22 outputs the standby command to the ECU 26 (S403 and S404). After receiving the standby command, the ECU 26 stands by without starting the operation.

At a time point t14, the DCU 22 specifies the lower unit necessary for executing the air conditioner operation (S405). At this time, the ECUs 26 and 27 in the same domain and the ECU 25 in the different domain are specified (see FIG. 5). Next, the DCU 22 derives the predetermined time until activation of all the specified lower units is completed (S406). Since the ECU 25 belongs to the domain different from the ECU 26 (adjacent domain), the time (7 seconds) obtained by adding the domain addition time (2 seconds) to the first predetermined time (5 seconds) is derived as the predetermined time. After deriving the predetermined time, the DCU 22 outputs the activation request command to all the specified lower units (S407). At this time, the DCU 22 does not output an activation request command to the ECU 26 that has already been activated. The activation request command to the ECU 25 belonging to the domain different from the DCU 22 is output to the ECU 25 through the DCU 21. At this time, first, in response to the activation request command from the DCU 22, the DCU 21 is activated (S401 and S402). Then, at a time point t15, the DCU 21 that has been activated outputs the activation request command to the ECU 25 (S403, S409, and S410). Thus, the ECU 25 is activated (S304 and S305). Thereafter, at a time point t16 when the predetermined time has elapsed from the time point t14, the DCU 22 outputs the operation start command to the ECUs 26 and 27 and the ECU 25. Thus, the charging operation by the ECUs 26 and 27 and the ECU 25 is started (S306 and S307). The operation start command to the ECU 25 is output to the ECU 25 through the DCU 21.

As described above, by preventing the predetermined operation from being started until the activation of all the lower units that have received the activation request command has been completed, even if the predetermined operation includes communication for failure detection, the occurrence of communication abnormality or erroneous detection of failure as described above can be suppressed when the charging function or the air conditioner function is operated.

According to the embodiment of the present invention, the following functions and effects can be obtained.

(1) The vehicle control apparatus 100 includes the plurality of control units 21 to 27 communicable with each other. The plurality of control units 21 to 27 include the host units (DCUs 21 and 22) and the lower units (ECUs 23 to 27) managed by the host units. One of the lower units includes the start signal input unit (signal input unit) 231 that receives the signal (start signal) for starting the predetermined operation of the vehicle control apparatus 100. The host units each include the specification unit 212 that specifies the lower unit to be used for executing the predetermined operation among the lower units when the signal input unit 231 receives the start signal, the activation request command unit (first command unit) 213 that outputs the activation request command to the lower unit specified by the specification unit 212, and the operation start command unit (second command unit) 215 that outputs the operation start command of the predetermined operation to the lower unit specified by the specification unit 212 after the predetermined time has elapsed since the activation request command is output by the first command unit 213.

Thus, when the plurality of lower units are activated, the operation start timings of the respective lower units can be aligned. Therefore, it is possible to prevent a communication process (communication process for failure detection, etc.) from being performed with the lower unit that is not activated. Therefore, it is possible to suppress communication abnormality or erroneous detection of failure which may occur when the respective lower units are activated at different timings.

(2) The predetermined operation includes the failure detection operation of the DCUs 21 and 22 and the ECUs 23 to 27 via communication. Thus, when the timer function such as the charging function or the timer air conditioner function is operated, each of the lower units can start the failure detection operation without causing communication abnormality or erroneous detection of failure.

(3) When the plurality of lower units are specified by the specification unit 212, the first command unit 213 outputs the activation request command to each of the lower units specified by the specification unit 212. Further, the second command unit 215 outputs the operation start command of the predetermined operation to each of the lower units specified by the specification unit 212 after the predetermined time has elapsed from the output of the activation request command by the first command unit 213. Thus, even when the predetermined operation started by the timer function such as the timer charging function or the timer air conditioner function is executed by the plurality of lower units, communication abnormality or erroneous detection of failure can be suppressed.

(4) The host unit includes the storage unit 216 that previously stores the activation time from the time when the activation request command is output by the first command unit 213 to the time when all the plurality of lower units become communicable. The predetermined time deriving unit 214 derives the activation time stored in the storage unit 216 as the predetermined time. Thus, the operation of those lower units can be started when all the lower units used for executing the predetermined operation are in the communicable state, so that communication abnormality or erroneous detection of failure can be more surely suppressed.

(5) The vehicle control apparatus 100 includes the first host unit (DCU 21) and the second host unit (DCU 22) belonging to the different domains. When the lower unit in the different domain (ECU 26 or ECU 27 in the domain D2) is specified by the specification unit 212 of the first host unit, the predetermined time deriving unit 214 of the first host unit derives the predetermined time by adding the predetermined addition time (domain addition time) to the activation time stored in the storage unit 216 of the first host unit. Thus, even when the lower unit belonging to the different domain is included in the lower units used for executing the predetermined operation, the operation of those lower units can be started when all those lower units are in the communicable state.

Figure 8:
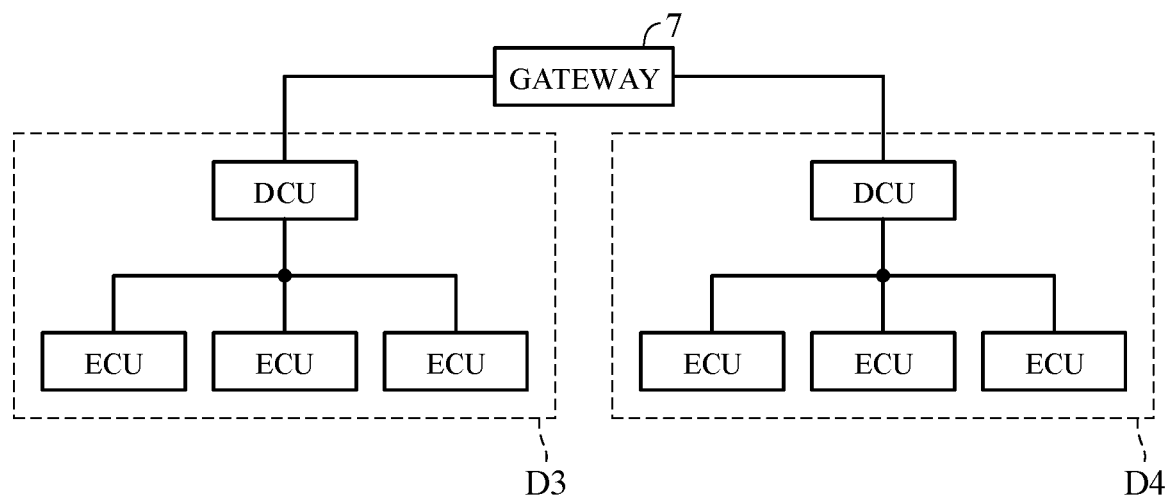
FIG. 8 is a diagram showing another schematic configuration of the vehicle control apparatus according to an embodiment of the present invention.

The configuration of the vehicle control apparatus 100 is not limited to that shown in FIG. 1B. For example, as shown in FIG. 8, the plurality of ECUs of the vehicle control apparatus 100 may be assigned to a domain D3 and a domain D4 connected through a gateway (relay device) 7. However, when the lower unit activates the lower unit belonging to the adjacent domain connected through a gateway 7, the activation time becomes longer than the activation time (second activation time described above) when the gateway 7 is not used. Therefore, the activation time when the lower unit activates the lower unit belonging to the adjacent domain connected through the gateway 7 is set to 10 seconds obtained by adding the gateway addition time (3 seconds) to the second activation time (7 seconds). That is, if m gateways are installed between the domain to which the lower unit belongs and the n adjacent domain when the lower unit activates the lower unit belonging to the n adjacent domain, the activation time is a time obtained by adding (2×n) seconds and (3×m) seconds to the first activation time. Therefore, information indicating the gateway addition time may be stored in the storage unit 216. For example, in the case where the gateway 7 is provided between the domain D1 and the domain D2 shown in FIG. 1B, when the specification unit 212 of the host unit 21 in the domain D1 specifies the lower unit in the domain D2 (S405), the predetermined time deriving unit 214 of the host unit 21 derives the predetermined time by adding the first addition time (domain addition time) and the second addition time (gateway addition time) to the activation time stored in the storage unit 216 of the first host unit 21.

The above embodiment may be modified into various forms. A modification will be described below. In the above embodiment, although the example in which the plurality of control units of the vehicle control apparatus are assigned to two domains has been described, the plurality of control units may be assigned to three or more domains, or may be assigned to one domain.

In the above embodiment, the activation time (first activation time) when the lower unit activates the lower unit belonging to the same domain is 5 seconds, but the activation time of each lower unit may be different. Therefore, the information indicating the activation time for each lower unit may be previously stored in the storage unit or the like of the DCU, and the DCU may determine the first activation time based on the information. For example, the longest activation time among the activation times of the respective lower units necessary for executing the predetermined operation may be set as the first activation time. If the longest activation time differs, the longest activation time among those activation times may be set as the first activation time.

The above embodiment can be combined as desired with one or more of the above modifications. The modifications can also be combined with one another.

According to the present invention, it is possible to suppress occurrence of erroneous detection of failure or communication abnormality in a vehicle control apparatus including a plurality of ECUs.

Above, while the present invention has been described with reference to the preferred embodiments thereof, it will be understood, by those skilled in the art, that various changes and modifications may be made thereto without departing from the scope of the appended claims.

What is claimed is:

1. A vehicle control apparatus comprising a plurality of control units communicable with each other via an on-vehicle communication network, wherein
    the plurality of control units include a host unit, and a plurality of lower units assigned to a lower hierarchy than the host unit and managed by the host unit,
    the host unit includes a first microprocessor and a first memory connected to the first microprocessor,
    the lower units each include a second microprocessor and a second memory connected to the second microprocessor, wherein
    the first memory stores a table that associates a predetermined operation with one or more necessary lower units for executing the predetermined operation among the plurality of lower units,
    the second microprocessor of one of the lower units is configured to perform outputting, when receiving a start signal of the predetermined operation, an activation request command to the host unit via the on-vehicle communication network,
    the first microprocessor is configured to perform:
        when receiving the activation request command from the one of the lower units, activating the host unit, and outputting a standby command to the one of the lower units via the on-vehicle communication network for preventing failure detection from being executed at the one of the lower units;
        specifying the necessary lower units from the plurality of lower units based on the predetermined operation as stored in the table; and
        outputting the activation request command to the necessary lower units via the on-vehicle communication network;
    the second microprocessor of each of the necessary lower units is configured to further perform maintaining a state in which the failure detection is not performed if the standby command is received from the host unit, and activating its own lower unit when receiving the activation request command from the host unit, and
    the first microprocessor is configured to further perform outputting, after a predetermined time elapsed since the activation request command is output to the necessary lower units, an operation start command to the necessary lower units via the on-vehicle communication network to execute the predetermined operation,
    the second microprocessor of each of the necessary lower units is configured to further perform starting the predetermined operation when receiving the operation start command.

2. The vehicle control apparatus according to claim 1, wherein
    the first microprocessor is configured to further perform predicting the predetermined time.

3. The vehicle control apparatus according to claim 1, wherein
    the first microprocessor is configured to further perform outputting the standby command along with the activation request command to each of the necessary lower units.

4. The vehicle control apparatus according to claim 1, wherein
    the first memory stores an activation time from a time when the activation request command is output to a time when all of the lower units become communicable, and
    the first microprocessor is configured to further perform deriving the activation time stored in the first memory as the predetermined time.

5. The vehicle control apparatus according to claim 4, wherein
    the host unit is a first host unit, and
    the first microprocessor is configured to perform
        the deriving including deriving, when a lower unit managed by a second host unit belonging to a different domain from a domain in which the first host unit belongs is specified, the predetermined time by adding a predetermined addition time to the activation time stored in the first memory.

6. The vehicle control apparatus according to claim 5, wherein
    the predetermined addition time is a first addition time, and
    the first microprocessor is configured to perform
        the deriving including deriving, when the lower unit managed by the second host unit is specified when the first host unit and the second host unit are connected via a relay device, the predetermined time by adding the first addition time and a second addition time to the activation time stored in the first memory.

7. The vehicle control apparatus according to claim 1, wherein
    the predetermined operation comprises an air conditioner operation.

8. The vehicle control apparatus according to claim 1, wherein
the predetermined operation comprises a charging operation of a battery.

9. The vehicle control apparatus according to claim 1, wherein
the second microprocessor of the one of the lower units is configured to perform the outputting including outputting, when receiving the start signal of the predetermined operation, the activation request command to the host unit along with identification information for the predetermined operation via the on-vehicle communication network,
the first memory stores the table that associates the identification information for the predetermined operation with identification information for the necessary lower units, and
the first microprocessor is configured to perform:
reading from the table, the identification information for the necessary lower units associated with the identification information for the predetermined operation received together with the activation request command; and
the specifying including specifying the necessary lower units from the plurality of lower units based on the identification information read from the table.

10. A vehicle control apparatus comprising a plurality of control units communicable with each other via an on-vehicle communication network, wherein
the plurality of control units include a host unit, and a plurality of lower units assigned to a lower hierarchy than the host unit and managed by the host unit,
the host unit includes a first microprocessor and a first memory connected to the first microprocessor, and
the lower units each include a second microprocessor and a second memory connected to the second microprocessor, wherein
the first memory stores a table that associates a predetermined operation with one or more necessary lower units for executing the predetermined operation among the plurality of lower units,
the second microprocessor of one of the lower units is configured to function as:
a start signal input unit configured to receive a start signal of the predetermined operation, and output an activation request command to the host unit via the on-vehicle communication network,
the first microprocessor is configured to function as:
an input unit configured to, when receiving the activation request command from the one of the lower units, activate the host unit;
a specification unit configured to output a standby command to the one of the lower units via the on-vehicle communication network for preventing the failure detection from being executed at the one of the lower units, and specify the necessary lower units from the plurality of lower units based on the predetermined operation as stored in the table, and
a first command unit configured to output the activation request command to the necessary lower units via the on-vehicle communication network;
the second microprocessor of each of the necessary lower units is configured to function as:
an execution unit configured to maintain a state in which the failure detection is not performed if the standby command is received from the host unit and
an activation request input unit configured to activate its own unit when receiving the activation request command from the host unit; and
the first microprocessor is configured to further function as:
a second command unit configured to output, after a predetermined time elapsed since the activation request command is output to the necessary lower units, an operation start command to the necessary lower units via the on-vehicle communication network to execute the predetermined operation,
the execution unit of each of the necessary lower units is configured to start the predetermined operation when receiving the operation start command.

11. The vehicle control apparatus according to claim 10, wherein
the first command unit is configured to predict the predetermined time.

12. The vehicle control apparatus according to claim 10, wherein
the first command unit is configured to output the standby command along with the activation request command to each of the necessary lower units.

13. The vehicle control apparatus according to claim 10, wherein
the first memory stores an activation time from a time when the activation request command is output by the first command unit to a time when all of the lower units become communicable, and
the first microprocessor is configured to further function as:
a predetermined time deriving unit configured to derive the activation time stored in the first memory as the predetermined time.

14. The vehicle control apparatus according to claim 13, wherein
the host unit is a first host unit, and
the predetermined time deriving unit is configured to derive, when a lower unit managed by a second host unit belonging to a different domain from a domain in which the first host unit belongs is specified by the specification unit, the predetermined time by adding a predetermined addition time to the activation time stored in the first memory.

15. The vehicle control apparatus according to claim 14, wherein
the predetermined addition time is a first addition time, and
the predetermined time deriving unit is configured to derive, when the lower unit managed by the second host unit is specified by the specification unit when the first host unit and the second host unit are connected via a relay device, the predetermined time by adding the first addition time and a second addition time to the activation time stored in the first memory.

16. The vehicle control apparatus according to claim 10, wherein
the predetermined operation comprises an air conditioner operation.

17. The vehicle control apparatus according to claim 10, wherein
the predetermined operation comprises a charging operation of a battery.

18. The vehicle control apparatus according to claim 10, wherein
the start signal input unit is configured to receive the start signal of the predetermined operation, and output the activation request command to the host unit along with identification information for the predetermined operation via the on-vehicle communication network, the first memory stores the table that associates the identification information for the predetermined operation with identification information for the necessary lower units, and the specification unit is configured to read from the table, the identification information for the necessary lower units associated with the identification information for the predetermined operation received from the one of the lower units together with the activation request command, and specify the necessary lower units from the plurality of lower units based on the identification information read from the table.

19. A vehicle control method of a vehicle control apparatus comprising a plurality of control units communicable with each other via an on-vehicle communication network, the plurality of control units including a host unit and a plurality of lower units assigned to a lower hierarchy than the host unit and managed by the host unit, the host unit including a first microprocessor and a first memory connected to the first microprocessor, the lower units each including a second microprocessor and a second memory connected to the second microprocessor, the first memory storing a table that associates a predetermined operation of the vehicle control apparatus with necessary lower units for executing the predetermined operation among the plurality of lower units, the vehicle control method comprising:

outputting, via the second microprocessor of one of the lower units, an activation request command to the host unit via the on-vehicle communication network when receiving a start signal of the predetermined operation, when receiving the activation request command from the one of the lower units, activating the host unit via the first microprocessor, and outputting a standby command to the one of the lower units via the on-vehicle communication network for preventing failure detection from being executed at the one of the lower units;

specifying the necessary lower units from the plurality of lower units based on the predetermined operation as stored in the table;

outputting an activation request command to the necessary lower units via the on-vehicle communication network;

maintaining, at each of the necessary lower units, a state in which the failure detection is not performed if the standby command is received from the host unit;

activating, at each of the necessary lower units, its own unit via the second microprocessor when receiving the activation request command from the host unit, and, outputting, after a predetermined time elapsed since the activation request command is output, an operation start command from the host unit via the first microprocessor to the necessary lower units via the on-vehicle communication network to execute predetermined operation; and starting, at each of the necessary lower units, the predetermined operation when receiving the operation start command.

* * * * *